Aug. 14, 1923.

N. TRBOJEVICH

METHOD OF FORMING SPIRAL BEVEL GEARS

Filed Jan. 3, 1922

Inventor
Nikola Trbojevich

By Whittemore Hulbert Whittemore
 + Belknap       Attorneys

Patented Aug. 14, 1923.

1,465,150

UNITED STATES PATENT OFFICE.

NIKOLA TRBOJEVICH, OF DETROIT, MICHIGAN.

METHOD OF FORMING SPIRAL BEVEL GEARS.

REISSUED

Application filed January 3, 1922. Serial No. 526,511.

*To all whom it may concern:*

Be it known that I, NIKOLA TRBOJEVICH, a subject of the King of Yugoslavia, residing at Detroit, in the county of Wayne and State of Michigan, have invented certain new and useful Improvements in Methods of Forming Spiral Bevel Gears, of which the following is a specification, reference being had therein to the accompanying drawings.

The invention relates to the manufacture of spiral bevel gears and has for its primary object the simplification of the method of generation. In the present state of the art one method which is extensively used in the manufacture of spur gears is known as "hobbing" and consists in cutting the teeth of the gear by a helical cutter, continuously rotated in timed relation to a rotating gear blank and also given a movement of translation across said blank. Such hobbing process is not, however, applicable to the cutting of bevel gears of conventional form, for the obvious reason that neither the teeth nor the interdental spaces of bevel gears are of uniform cross section throughout their length. Certain modified hobbing processes have been suggested for the cutting of bevel gears but without the use of a helical cutter. Also, the theoretical possibility of cutting a spiral bevel gear by a tapering helical hob of changing pitch has been recognized, but the mechanical difficulties involved in the accurate manufacturing of such a hob are such as to render it of no practical utility.

The present invention involves the discovery that a spiral bevel gear of a novel type can be produced by a hobbing process and by the employment of a simple construction of hob of the tapering helical type. The invention therefore consists; first, in the novel construction of the gear; second, in the method employed for its generation; third, in the apparatus by which the method is carried out. The claims of the present application are, however, confined to the method, the gear and the apparatus forming the subject-matter of other applications.

In the drawings:

Figure 9 is a pitch cone development of the hob;

Figures 10 and 11 are diagrammatic views showing respectively the plan and side elevation of the hob and gear blank in cooperative relation.

Figure 12 is a diagrammatic view illustrating geometrically the relationship of an Archimedean spiral and an abridged involute.

To understand the invention, it is necessary first to refer to the basic principle involved. As is well known, a bevel gear may be regarded as a development from a segment of an annular rack or crown gear; also, all gears which are developed from the same crown gear, whatever the angle of the bevel, will run in mesh with each other. The usual type of spiral bevel gear forms in its development in the crown gear a series of non-parallel curves. There is also a type of spiral bevel gear, the longitudinal curves of the teeth of which are involutes of a circle and are therefore parallel. Neither of these types can be generated by a hobbing process employing a simple helical hob. I have discovered that by selecting a new type of curve for the gear tooth, which curve may be designated as a modified involute of a circle, and by also using a simple tapering helical hob of selective dimensions, and, further, by first setting and then moving the hob in a predetermined relation to the gear blank, said blank may be cut without interference or mutilation of any portion thereof.

Figure 1:
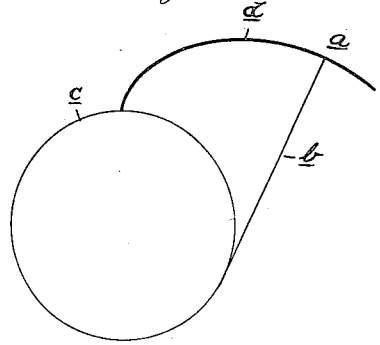
Figures 1 to 7 show diagrammatically the geometrical principles involved.
Figure 2:
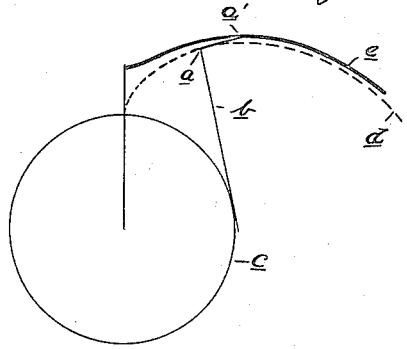
Figure 3:
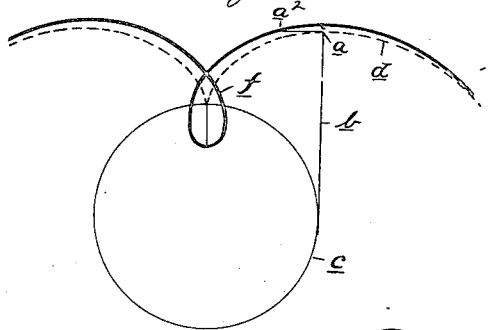
Figure 4:
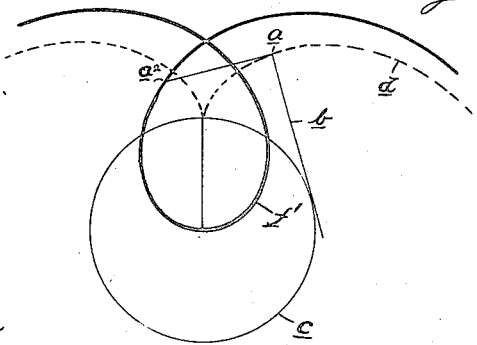

The geometrical principles involved in this discovery will be readily understood from the following: Figure 1 represents an involute of a circle which is regarded as generated by a point $a$ on a string $b$, which is unwound from a base circle or drum $c$ and traces the curve $d$. If the point $a$ is offset from the string, either outwardly or inwardly, but maintained in fixed relation thereto, the trace of such offset point will be a modified involute. As shown in Fig. 2, the point $a'$ is outwardly offset and will trace a curve $e$ which may be termed an extended involute. In Fig. 3 the point $a^2$ is inwardly offset and will trace a curve $f$, which may be termed an abridged involute. If, as shown in Fig. 4, the degree of abridgment or inward offsetting of the point is such as to make it initially coincide with the center of the base circle, the abridged involute curve $f'$ which is traced, will be a true Archimedean spiral.

That the abridged involute reduces to an Archimedean spiral when the abridgment is numerically equal to the radius of the base circle, is readily seen from Figure 12. A point P of the line $t$ describes a common involute $s$ when said line rolls on the circumference of the circle $c$. Owing to the method of generation, the line $t$ is always a normal of the involute $s$, and the momentary center of curvature is at Q. The length of the line P Q is equal to the length of the developed arc R Q which, in turn is equal to $r_0\varphi$, if $r_0$ denotes the radius of the base circle. To construct a point $P_1$ of the Archimedean spiral, a perpendicular $PP_1$ is erected at P, and the distance $PP_1$ is made equal to $OQ=r_0$. It follows that the quadrangle $OQPP_1$ is rectangle, because $OQ=P_1P$ and the angles OQP and $QPP_1$ are both right angles. Hence the radius vector of the Archimedean spiral $OP_1=QP=r_0\varphi$. It is also evident that the vectorial angle of the spiral $\varphi'=\varphi$, because the side SO is perpendicular to OR, and $OP_1$ to OQ. Therefore: $OP_1=r=r_0\varphi'$ or the radius vector is proportional to the vectorial angle, which is the definition of an Archimedean spiral. In this connection it is to be noted that the line $P_1Q$ is a normal of the spiral $s_1$, because Q is the center of instantaneous rotation both for P and $P_1$. A circular arc struck from Q with a radius $QP_1$ is, therefore, tangent to the spiral $s_1$ at $P_1$.

Figure 5:
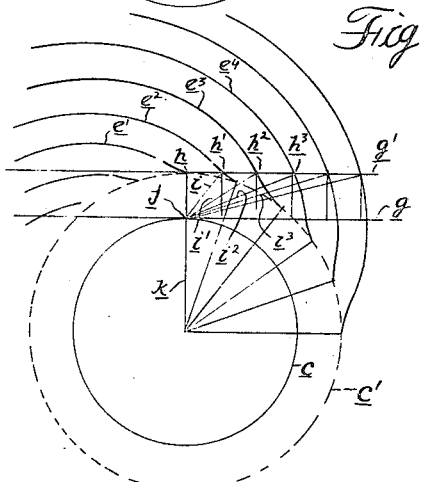

As shown in Figure 5, a rigid parallelogram $g$ is substituted for the string and is rolled around the circle $c$ without sliding. If a circle $c'$ concentric to the circle $c$ is drawn so as to be tangent to the outer side $g'$ of the parallelogram $g$, then in the rolling of said parallelogram without sliding about the base circle $c$, the outer side $g'$ will both roll and slide upon the circle $c'$. Thus, a series of equi-distant points $h$, $h'$, etc., on the outer line $g'$ of the parallelogram will, in the rolling of said parallelogram as just described, trace a series of extended involute curves $e'$, $e^2$, etc., as indicated in Fig. 5, which may be regarded as generated either by said parallelogram, rolling upon the circle $c$, or by points in the line $g'$ rolling and uniformly sliding upon the circle $c'$. If, from the points $h'$, $h^2$, $h^3$, lines $i$, $i'$, $i^2$ be drawn to the point $j$ (the point of tangency of the parallelogram with the circle $c$ as shown in Fig. 5), such lines will be respectively normal to the curves $e^2$, $e^3$, $e^4$, since because of the method of construction the point $h'$, $h^2$, $h^3$ momentarily rotate about the point $j$ as a center. A similar relation will exist between the normals drawn from all points in the generated curves which lie in a line tangent to the circle $c'$, said normals all passing through a common point, which is the intersection with the base circle $c$ of the radius $k$ from the point of tangency of the line $g'$ in the circle $c'$.

Figure 6:
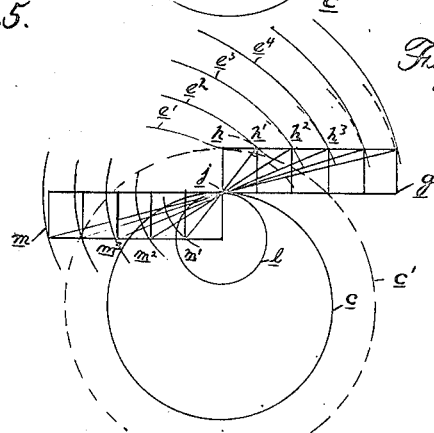

In Figure 6 a base circle $l$ of smaller radius than the circle $c$ is arranged tangent to the latter at the point of tangency of the parallelogram $g$. If the parallelogram is rolled about the smaller circle, the points $h$, $h'$, etc., will trace another series of modified involute curves which are, however, respectively tangent to the curves $e'$, $e^2$, etc., because the normals of the superposed point $h'$, $h^2$, etc., all pass through the point $j$ the common instantaneous center of rotation for both systems. If a second parallelogram $m$ exactly similar to the parallelogram $g$ is arranged to extend inward from the point of tangency $j$, then the series of equi-distant points $m'$, $m^2$, etc., corresponding to the points $h$, $h'$, etc., will in the rolling of this parallelogram about either the circle $c$ or the circle $l$ trace a series of abridged involute curves. If the radius of the circle $l$ is equal to the width of the parallelogram then the points $m$, $m'$, etc., will trace curves which are Archimedean spirals.

Figure 7:
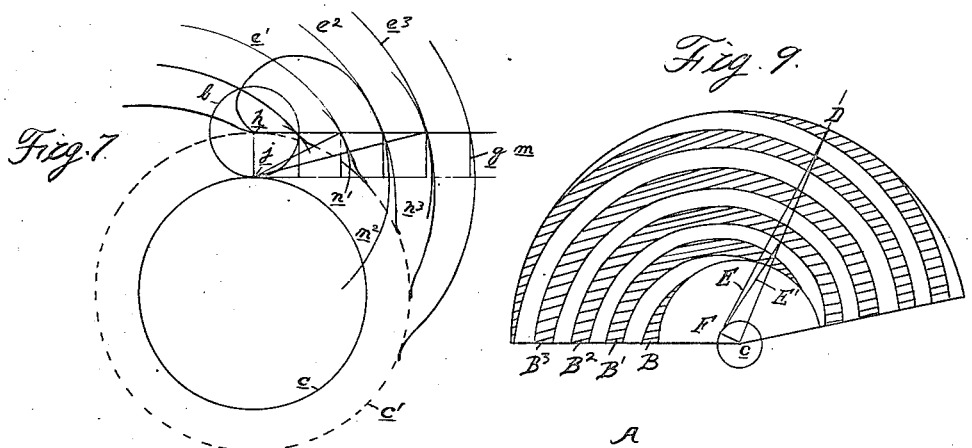

In Figure 7 the parallelogram $m$ is swung about the point $j$ to a position where it coincides with the parallelogram $g$, this bringing the base circle $l$ to the outside of the base circle $c$ and tangent thereto at the point $j$. In this position the Archimedean spiral curves $n$, $n'$, etc., will be tangent to the curves $e'$, $e^2$, etc.

It will be evident from the above that any series of modified involute curves generated by points in a line parallel to but offset from a line tangent to the base circle can be arranged respectively in tangent relation to any other series of modified involute curves generated by equally spaced points in an equally offset line tangent either to the same base circle or to a base circle of greater or smaller diameter, the line being offset either outwardly or inwardly from the base circle. Most important, however, it is evident that a series of Archimedean spiral curves so generated can be arranged in tangent relation to any other similar series of modified involute curves. Therefore it is mathematically possible, as will be hereinafter set forth, to generate a spiral bevel gear, the teeth of which are of longitudinally modified involute curvature, by means of a hob which is a development of a simple Archimedean spiral.

The mathematical principle which makes my invention possible may be briefly stated as follows: I have discovered a relationship between the modified involutes on one hand, and the Archimedean spiral on the other, in that both are tangential, or what might be termed, asymptotic curves to a common involute. Being tangential curves they are subject to the well known mathematical rule that a normal to a tangential curve at any point must pass through the center of curvature, (point Q in Figure 12) of the corresponding point of the parent curve. (See Scheffers' Theorie der Kurven, 2nd edition, p. 99.)

It is a property of common involutes that the generating line is always perpendicular to the curve itself, while the center of curvature coincides with the point of tangency of said line with the base circle. From this follows that a series of involutes such as might be generated by a number of equi-spaced points of a straight line, are all parallel and have a common center of curvature at every instant. I constructed, therefore, two series of tangential curves, modified involutes and Archimedean spirals respectively, from two corresponding parent series of common involutes by using as a generator a rack of constant pitch and infinitesimal thickness. Said rack does not intersect the generated curves at right angles (as is the case with common involutes) but at variable acute angles $hh^1j$, $hh^2j$, $hh^3j$, etc., Figure 6, resulting in a gradual increase of the normal pitch, that is, an outward divergence of said curves. However, all normals along the generator meet in the same point $j$, Figure 7, for both series; in other words, the corresponding curves $h^1m^1$, $h^2m^2$, etc., are tangent and do not interfere with each other in the immediate neighborhood of the generating line $g^1$. It is true that there is a secondary crossing or interference between the corresponding curves of the two series further away, but that intereference is only apparent and would take place only if both the hob and the gear to be cut were plane developments, that is, crown gears. However, the hob which I am using is always pinion shaped, and the cone angle and the pressure angle of teeth are so selected that no secondary interference occurs even when a crown gear is being cut.

The process of reasoning, therefore, consisted of four steps or stages. First, there was "a priori" demand that the hob must be of a conical shape in order to finish the concave sides of a spiral bevel tooth, and "clear" the convex sides. Second, the hob must be produced by means of machinery employing gear trains and other elements of a constant ratio only. Third, the process of hobbing the gears also must be accomplished by constant ratio elements, such as gearing, slides, etc. Fourth, the finished gear must satisfy certain practical requirements as to strength of teeth, width of face, helical angle, pressure angle, etc. From those four premises the present method was evolved.

Figure 8:
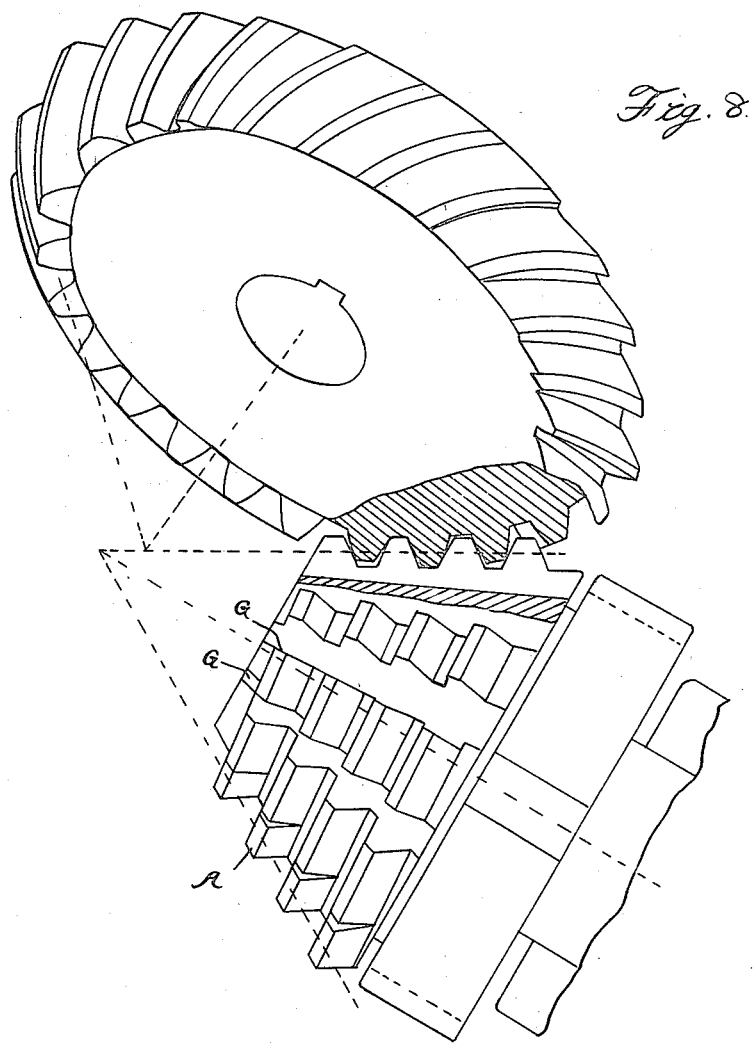
Figure 8 is a sectional elevation showing the hob in engagement with the gear blank.

In Figure 8 A illustrates a tapering hob having a longitudinal rack section of constant pitch in engagement with the improved spiral gear.

Figure 9 shows a development of the pitch cone of this hob and, as shown, the successive threads B, B', etc., are Archimedean spiral curves. C is a center corresponding to the apex of the cone, and D is a radius drawn from this center and crossing the curves. E, E', etc., are lines drawn from the points of intersection in the radius D of the successive curves and respectively normal to said curves. All of these lines will meet in a common point F, which is a predetermined distance from the center C according to the pitch of the spiral curves and which is known as the "polar subnormal."

It is evident that this Fig. 9 corresponds to that shown in Fig. 7 and if the spacing of the curves is the same and the distance of the polar sub-normal from the center is equal to the offsetting of the point $h$ from the circle C, the two figures can be superposed with the curves of the one tangent to the curves of the other.

The hob shown in Fig. 8 is longitudinally slotted or gashed, as indicated at G, which, in effect, forms thereof a series of rack cutters arranged in spiral relation to each other. Thus by relatively arranging the hob or cutter and the gear blank so as to be tangent to a common plane and in the relation indicated in Fig. 7 and by relatively rotating the hob and cutter and also imparting a movement of translation about the center of the base circle, gear teeth which are longitudinally non-parallel and of modified involute curvature will be developed.

In the practical method of manufacturing gears, the hobs are first formed with reference to the pitch of the gears to be cut. The hob blanks are of truncated conical form, the cone angle being between 20° and 45°, but preferably of 30°. The cross section and lead of the helical thread is determined by the pitch of the gears to be cut and also by whether a single or multiple thread is used. The length of the hob and the distance from the apex of the cone is also selected with respect to the particular work to be performed.

The operations required when cutting the gear are, first, the setting of the hob and the gear blank so that their pitch cones are tangent to a common plane, the axis of the hob being spaced from the calculated base circle of the gear by a distance equal to the polar sub-normal of the hob and the apex of the cone being in the radial line which passes through the imaginary point of tangency to the base circle, as indicated in Figs. 10 and 11. After the setting of the hob and blank, rotational movement is imparted thereto and the ratio is such that each revolution of the hob will advance either one tooth of the gear or an exact multiple thereof. A relative movement of translation is given to the blank and cutter around an axis, which passes through the pitch cone of the blank and which is perpendicular to the tangent plane. This will cause the cutter to progressively be fed into engagement with the blank and across the face thereof, thereby tracing the longitudinal contour of the teeth, while at the same time the rotational movement of the blank and cutter will develop the cross-sectional contour thereof. When complete, the gear will be of a form which will run in perfect mesh with any other gear formed by a similar cutter or hob but of the opposite hand. Thus a right-hand hob will cut a left-hand gear and a left-hand hob a right-hand gear, or vice versa, but if the polar sub-normals and the relative setting is the same, the gears will exactly mesh.

As previously stated, the important feature of my method is that a simple tapering hob of constant lead is used instead of the complex constructions which have heretofore been suggested. Furthermore, I have discovered that by this method gears may be cut without mutilation, whereas in all other attempts at hobbing spiral bevel gears the teeth thereof have been more or less mutilated.

What I claim as my invention is:

1. The method of generating spiral bevel gears having teeth which are longitudinally non-parallel and of modified involute form, which consists in selecting a tapering spiral hob of a form which may be generated by the movement of a rack element of constant pitch in acute angular relation to the curves, in relatively rotating the hob and the gear blank in predetermined timed relation and in also imparting a relative movement of translation about the apex of the pitch cone of the blank.

2. The method of generating spiral bevel gears having teeth which are longitudinally non-parallel and of modified involute form, which consists in selecting a tapering spiral hob of substantially constant axial pitch, relatively rotating the hob and the gear blank in predetermined timed relation to each other and in imparting a relative movement of translation concentric to the apex of the pitch cone of the blank.

3. The method of generating spiral bevel gears having teeth which are longitudinally non-parallel and of modified involute form, which consists in selecting a tapering spiral hob of a form which, in development, is an Archimedean spiral having a predetermined relation to the development of the selected tooth curve, such relation being that the polar sub-normal of the spiral is equal to the distance of the generating point from the line rolling on the base circle of the selected curve.

4. The method of generating spiral bevel gears having teeth which are longitudinally of modified involute form and non-parallel, which method consists in selecting a tapering helical hob forming in development a series of modified involute curves, the modification of said curves having a predetermined relation to the modification of the longitudinal tooth curves of the gear to be generated; in relatively rotating the hob and gear blank in predetermined timed relation and in imparting a relative movement of translation concentric to an axis passing through the apex of the pitch cone of the blank.

5. The method of generating spiral bevel gears having teeth which are longitudinally modified involute form and are non-parallel consisting in selecting a tapering spiral hob of constant axial pitch and which in development forms an Archimedean spiral having a predetermined polar sub-normal in setting said hob in relation to the gear blank so that the pitch cones thereof will be tangent to a common plane with the imaginary apex of the hob cone perpendicular to a radius of the imaginary base circle for the gear and spaced from a line tangent to said base circle at the intersection of said radius by a distance equal to the polar sub-normal of the spiral; in relatively rotating the hob and the gear blank in timed relation to each other and in imparting a movement of translation to the hob concentric to the base circle of the gear blank.

6. The method of generating spiral bevel gears having teeth which are longitudinally spirals of the general involute type, which consists in selecting a tapering hob, the thread or threads of which are also longitudinally spirals of the general involute type, the latter having a different base radius but the same modification in absolute value as the former, in relatively rotating the hob and the gear blank in predetermined timed relation and in also imparting a relative movement of feed across the face of the blank.

7. The method of generating spiral bevel gears having teeth which are longitudinally spirals of the general involute type, which consists in selecting a tapering hob of a form which may be generated by the movement of a rack element of constant pitch along a geodesic line, in relatively rotating the hob and the gear blank in predetermined timed relation, and in also imparting a relative movement of feed about the apex of the pitch cone of the blank.

8. The method of generating spiral bevel gears having teeth which are longitudinally of modified involute form, which method consists in selecting a tapering helical hob forming in development a series of modified involute curves, the modification of said curves having a predetermined relation to the modification of the longitudinal tooth curves of the gear to be generated; in relatively rotating the hob and gear blank in predetermined timed relation and in imparting a relative movement of translation concentric to an axis passing through the apex of the pitch cone of the blank.

In testimony whereof I affix my signature.

NIKOLA TRBOJEVICH.